US007137885B1

(12) United States Patent
Loose

(10) Patent No.: US 7,137,885 B1
(45) Date of Patent: Nov. 21, 2006

(54) SLOT MACHINE REEL MECHANISM WITH DEDICATED LOCAL MICROCONTROLLER

(75) Inventor: Timothy C. Loose, Chicago, IL (US)

(73) Assignee: WMS Gaming, Inc., Chicago, IL (US)

(*) Notice: Subject to any disclaimer, the term of this patent is extended or adjusted under 35 U.S.C. 154(b) by 1135 days.

(21) Appl. No.: 09/635,956

(22) Filed: Aug. 10, 2000

(51) Int. Cl.
*G06F 17/00* (2006.01)
*A63F 13/00* (2006.01)

(52) U.S. Cl. .............................. 463/20; 463/16; 463/31

(58) Field of Classification Search .................. 463/20, 463/16
See application file for complete search history.

(56) References Cited

U.S. PATENT DOCUMENTS

| | | | | |
|---|---|---|---|---|
| 4,299,388 A | * | 11/1981 | Resch et al. | 273/143 R |
| 4,688,020 A | | 8/1987 | Kuehneman et al. | 340/365 VL |
| 4,692,571 A | | 9/1987 | Trinh et al. | 200/5 A |
| 4,773,647 A | | 9/1988 | Okada et al. | 273/143 |
| 5,074,559 A | * | 12/1991 | Okada | 273/143 R |
| 5,102,136 A | * | 4/1992 | Heidel et al. | 273/143 R |
| 5,169,147 A | * | 12/1992 | Hamano | 273/143 R |
| 5,251,898 A | * | 10/1993 | Dickenson et al. | 273/143 R |
| 5,380,008 A | * | 1/1995 | Mathis et al. | 463/18 |
| 5,579,002 A | | 11/1996 | Iggulden et al. | 341/23 |
| 5,584,764 A | | 12/1996 | Inoue | 463/20 |
| 5,759,102 A | | 6/1998 | Pease et al. | 463/42 |
| 5,938,196 A | * | 8/1999 | Antoja | 273/143 C |
| 5,938,529 A | | 8/1999 | Rodesch et al. | 463/20 |
| 6,102,394 A | | 8/2000 | Wurz et al. | |
| 6,135,887 A | | 10/2000 | Pease et al. | 463/42 |
| 6,244,957 B1 | * | 6/2001 | Walker et al. | 463/20 |
| 6,251,014 B1 | * | 6/2001 | Stockdale et al. | 463/16 |
| 6,315,663 B1 | * | 11/2001 | Sakamoto | 463/20 |
| 6,375,570 B1 | * | 4/2002 | Poole | 463/31 |

(Continued)

FOREIGN PATENT DOCUMENTS

EP 0 579 449 A2 1/1994

(Continued)

OTHER PUBLICATIONS

Microcomputers (Sandon, IBM Microelectronics Division, 1999, http://www.mrw.interscience.wiley.com/eeee/63/1663/W.1663-4.html.*

(Continued)

*Primary Examiner*—Corbett D. Coburn
*Assistant Examiner*—William H McCulloch
(74) *Attorney, Agent, or Firm*—Jenkens & Gilchrist

(57) ABSTRACT

A slot machine comprises a central processing unit (CPU) and a reel mechanism. The CPU operates the slot machine and randomly determines a game outcome in response to a wager. The reel mechanism includes a motor, a symbol-bearing reel, and a reel driver. The motor includes a rotatable shaft, and the reel is mounted to the shaft. The reel driver includes a local microcontroller distinct from and coupled to the CPU. The reel driver is coupled to the motor to cause the motor to rotate the reel. The CPU issues high-level commands to the reel driver related to rotation of the reel. The high-level commands may, for example, include a start spin command for starting rotation of the reel and a stop command for stopping the reel at a specified position. However, to free up the CPU for other tasks, the local microcontroller performs low-level reel driver operations related to the rotation of the reel. The low-level reel driver operations may, for example, include sampling a state of the reel in real time, performing calculations, and responding with control changes.

37 Claims, 3 Drawing Sheets

U.S. PATENT DOCUMENTS 6,394,900 B1 * 5/2002 McGlone et al. ....... 273/142 R

FOREIGN PATENT DOCUMENTS

| | | | |
|---|---|---|---|
| EP | 0 738 991 | A2 | 10/1996 |
| FR | 2 656 736 | A1 | 7/1991 |
| GB | 2 091 014 | A | 7/1982 |
| GB | 2 326 505 | A | 12/1998 |
| WO | WO 94/24683 | | 10/1994 |
| WO | WO 99/61994 | | 12/1999 |

OTHER PUBLICATIONS

"GAMMA B Link Protocol," Gaming Manufacturers Association, 30 pages (Jan. 21, 2000).

European Search Report for European Patent Application No. EP 01 40 1819 dated Jul. 14, 2003 (3 pages).

* cited by examiner

SLOT MACHINE REEL MECHANISM WITH DEDICATED LOCAL MICROCONTROLLER

FIELD OF THE INVENTION

The present invention relates generally to reel mechanisms for slot machines and, more particularly, to a reel mechanism having a dedicated local microcontroller for handling low-level reel driver operations associated with a reel of the reel mechanism.

BACKGROUND OF THE INVENTION

Conventional slot machines include a plurality of symbol-bearing reels that are rotated and stopped to place the symbols of each reel in visual association with one or more pay lines. Although some of these machines now simulate the reels using images on a video screen, many slot machines still employ mechanical reels. Each mechanical reel is mounted to the rotatable shaft of a stepper motor under the control of a central processing unit (CPU). The CPU includes reel driver software that monitors the reel and controls its positioning. This requires the CPU to sample the state of each reel in real time. The CPU must read the status of each reel hundreds of times per second, perform calculations, and respond with control commands. Because the CPU must perform a variety of other tasks, its overall performance is diminished by having to perform low-level reel driver operations in addition to these other tasks.

SUMMARY OF THE INVENTION

To overcome this drawback, the prevent invention provides a reel driver having a dedicated local microcontroller that assumes the low-level reel driver operations previously performed by the CPU. Because the local microcontroller performs the low-level reel driver operations, the CPU is free to provide better performance for other tasks.

In one embodiment, a slot machine comprises a CPU and a reel mechanism. The CPU operates the slot machine in response to a wager. The reel mechanism includes a motor, a symbol-bearing reel, and a reel driver. The motor includes a rotatable shaft, and the reel is mounted to the shaft. The reel driver includes a local microcontroller distinct from and coupled to the CPU. The reel driver is coupled to the motor to cause the motor to rotate the reel.

The CPU issues high-level commands to the reel driver related to rotation of the reel. The high-level commands may, for example, include a start spin command for starting rotation of the reel and a stop command for stopping the reel at a specified position. However, to free up the CPU for other tasks, the local microcontroller performs low-level reel driver operations related to the rotation of the reel. The low-level reel driver operations may, for example, include sampling a state of the reel in real time, performing calculations, and responding with control changes.

BRIEF DESCRIPTION OF THE DRAWINGS

The foregoing and other advantages of the invention will become apparent upon reading the following detailed description and upon reference to the drawings in which.

Figure 1:
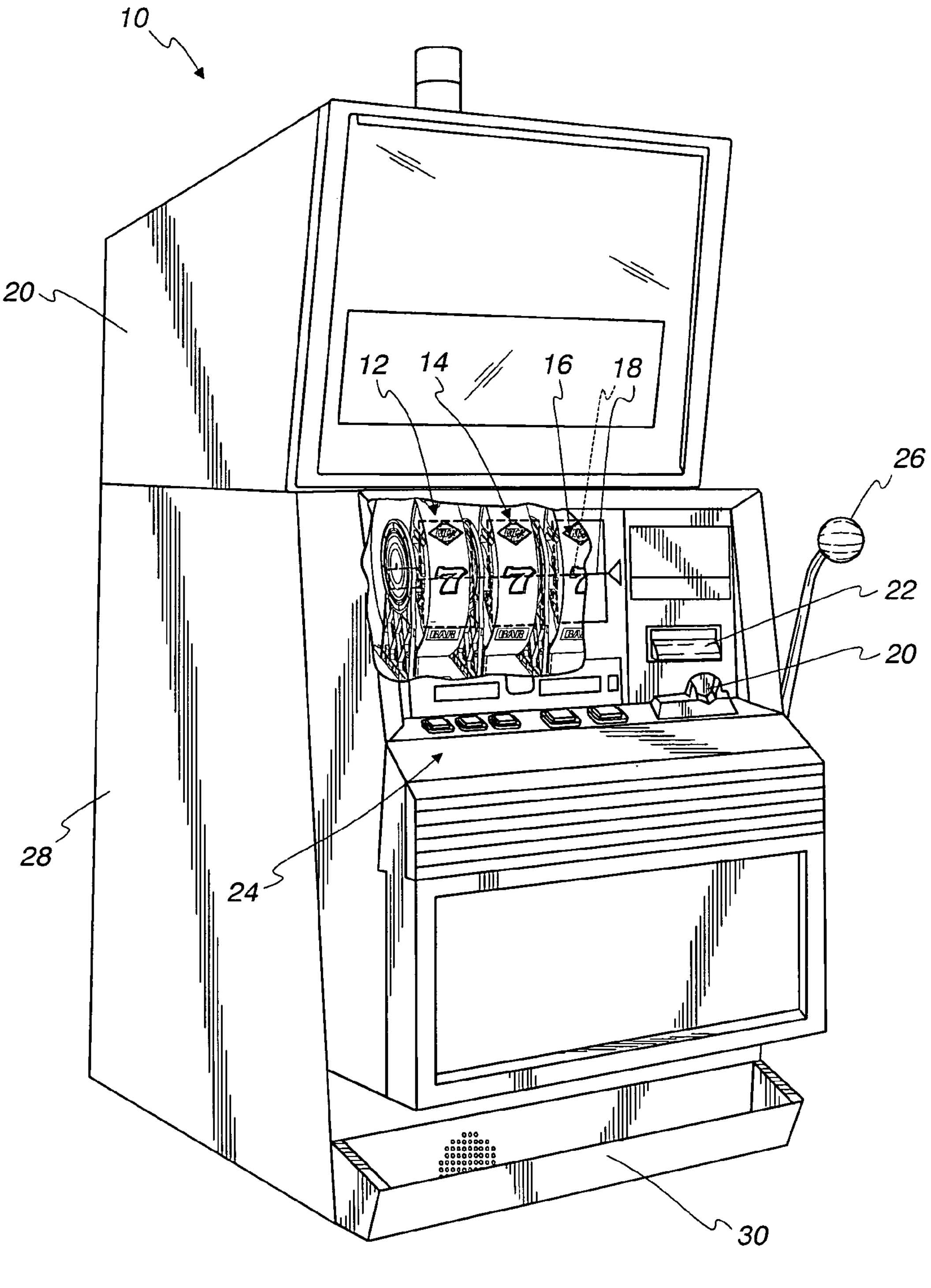
FIG. 1 is an isometric view of a slot machine embodying the present invention with portions broken away to reveal internal structure.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings, FIG. 1 depicts a slot machine 10 embodying the present invention. The slot machine 10 includes a cabinet 20 housing a plurality of symbol-bearing mechanical reels 12, 14, and 16 that are rotated and stopped to place the symbols of each reel in visual association with at least one pay line 18. Each pay line 18 preferably extends through at least one symbol on each of the reels. Each of the reels includes a number of discrete stop positions (e.g., eighteen) each of which corresponds to a respective symbol. The slot machine 10 may incorporate any number of reels, and each of the reels can include any reasonable number of stop positions. Any system of symbols can be utilized as long as there is one symbol, which may include a "blank" symbol, corresponding to each stop position on each reel.

To initiate game play, a player makes a wager by inserting coins into a coin slot 20, bills into a bill acceptor 22, or playing a number of credits. If the machine includes more than one pay line 18, the machine may automatically activate a number of pay lines corresponding to the number of coins or credits played. In addition, the machine may include keys on button panel 24 that allow the player to select the number of pay lines 18 to play and to select the number of coins or credits to bet on the selected pay lines.

In response to the wager, a "start" key and/or handle 26 is enabled. By pushing the "start" key or pulling the handle 26, the player causes a CPU housed within the slot machine's cabinet 28 to set the reels 12, 14, and 16 in motion. The CPU uses a random number generator to select a game outcome corresponding to a particular set of reel stop positions. The mechanical reels are then stopped at the selected set of stop positions. The symbols graphically illustrate the reel stop positions and indicate whether the stop positions of the reels represent a winning game outcome. Winning game outcomes (e.g., symbol combinations resulting in payment of coins or credits) are identifiable to the player by a pay table affixed to the machine 10. A winning game outcome occurs when the symbols appearing on the reels along an active pay line correspond to one of the winning combinations on the pay table. If the displayed symbols stop in a winning combination, the CPU credits the player an amount corresponding to the award in the pay table for that combination multiplied by the amount of credits bet on the winning pay line. The player may collect the amount of accumulated credits in a coin tray 30 by pressing a "Collect" key on button panel 24.

An example of a pay table for the slot machine is shown below:

| WINNING COMBINATION | | | PAYOFF |
|---|---|---|---|
| 7 | 7 | 7 | 200 |
| 3 Bar | 3 Bar | 3 Bar | 100 |
| 2 Bar | 2 Bar | 2 Bar | 40 |
| 1 Bar | 1 Bar | 1 Bar | 10 |
| Any Bar | Any Bar | Any Bar | 5 |
| Blank | Blank | Blank | 2 |

The pay table enables the player to view the winning combinations and their associated payoff amounts. From the pay table it can be seen that three of the same symbol along an active pay line generates a payoff for the following symbols: 7, 3 Bar, 2 Bar, 1 Bar, and Blank. Also, a mixed combination of the Bar symbols generates a payoff. The game may, of course, be modified to vary the payoffs associated with the winning combinations and to include winning combinations that do not span all of the reels and/or have other symbols such as fruit symbols, theme-based symbols, and wild symbols.

Figure 2:
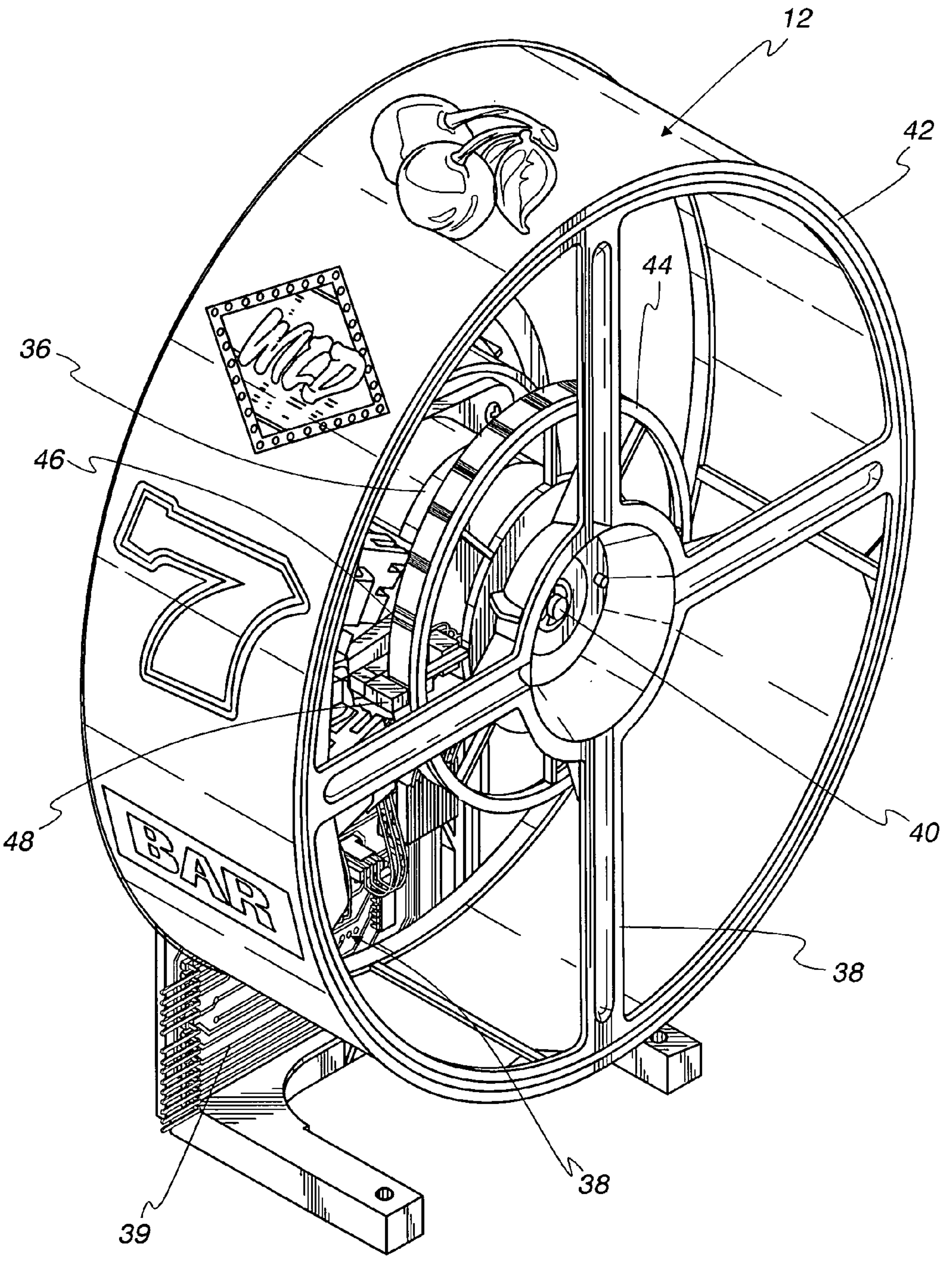
FIG. 2 is an isometric view of a reel mechanism of the slot machine.

The reels 12, 14, and 16 are associated with respective reel mechanisms. Because the three reel mechanisms are the same, only the reel mechanism including reel 12 is depicted in FIG. 2. The reel mechanism is mounted within the cabinet of the slot machine and includes a stepper motor 36, the symbol-bearing reel 12, and a reel driver 38. The reel 12 is mounted to a rotatable shaft 40 of the motor 36. The reel driver 38 includes a printed circuit board 39 proximate the reel 12 and is coupled to motor to cause the motor shaft 40 to rotate the reel 12.

The reel 12 includes an exterior cylinder 42 and an interior encoder wheel 44. A symbol-bearing strip is wrapped around and affixed to the exterior cylinder 42. The encoder wheel 44 preferably is a multi-tab notched disc mounted to either the motor shaft 40 or to the exterior cylinder 42. The center of the disc corresponds to an axis of rotation of the reel 12 and the motor shaft 40. The notched disc includes a plurality of equally spaced, identically shaped tabs (and subsequent notches) disposed along the disc's circumference. The tabs break an optical detector 48 of the reel driver 38 many times per revolution of the reel. One of the tabs that form the notches is uniquely patterned to define a single home position designated in FIG. 2 by the reference numeral 46. The remaining tabs are used to define the total number of symbol stops on the reel, as well as to detect reel motion caused by tampering or an error. As illustrated, the so-called "tabs" and "notches" may be defined by alternating opaque regions (tabs) and transparent regions (notches) of a cylindrical plastic member mounted to either the motor shaft 40 or to the exterior cylinder 42.

In an alternative embodiment, the encoder wheel 44 is single-tab disc mounted to either the motor shaft 40 or to the exterior cylinder 42. The disc contains a single tab that breaks the optical detector 48 of the reel driver 38 once per revolution of the reel. The leading edge of this tab defines the reel's home position and is used as a reference point (zero point) for determining where to stop the reel 12.

Figure 3:
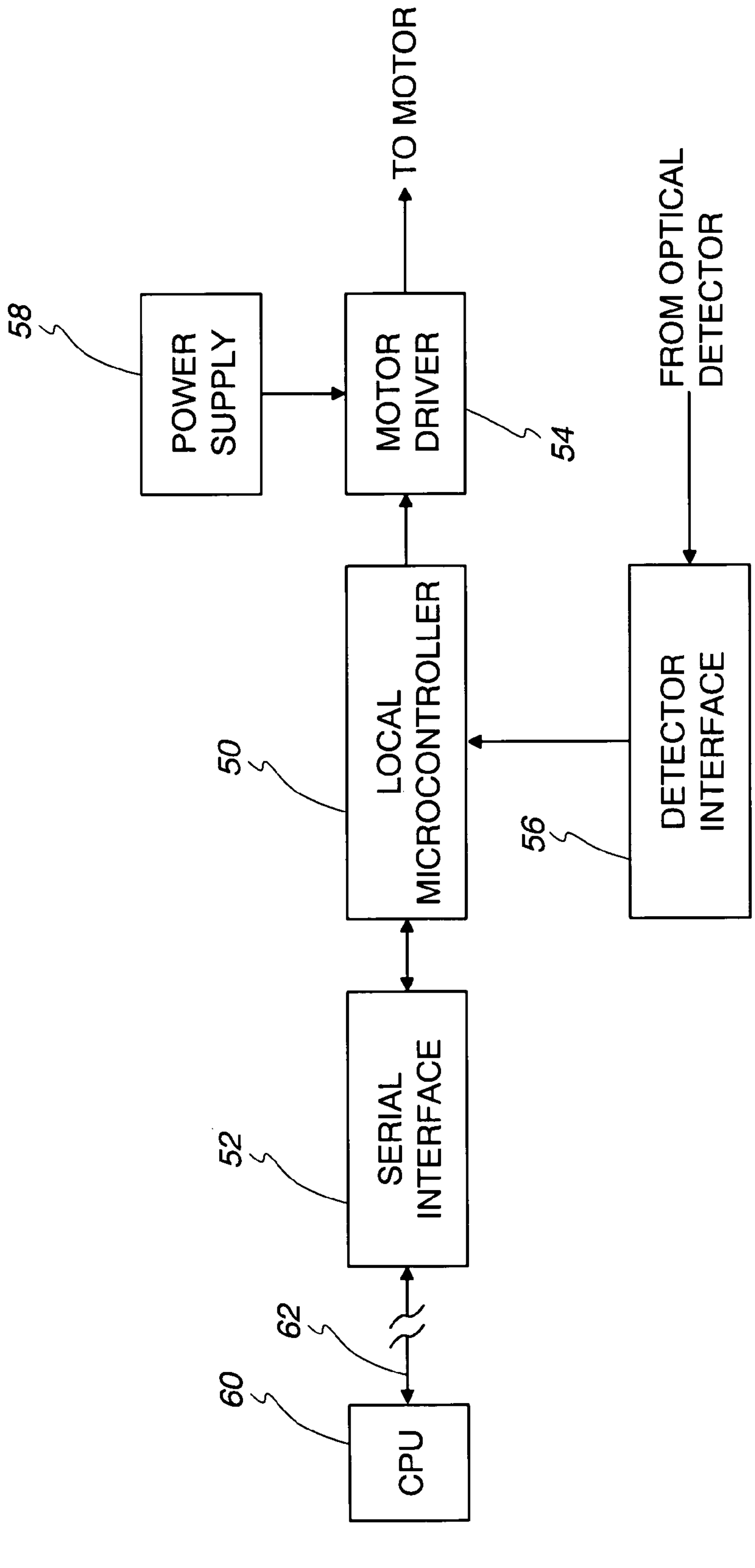
FIG. 3 is a block diagram of a CPU and the reel mechanism of the slot machine.

Referring to FIG. 3, in accordance with the present invention, the reel driver 38 includes a dedicated local microcontroller 50, a serial interface 52, a motor driver 54, a detector interface 56, the optical detector 48 (see FIG. 2), and a power supply 58. These components are mounted to the printed circuit board 39 shown in FIG. 2. The local microcontroller 50 is distinct from a main control unit or CPU 60 of the slot machine but is coupled thereto by a bi-directional serial link 62. The serial link 62 comprises a single cable, and examples of suitable serial links are a Universal Serial Bus (USB), Firewire, RS-232, RS-485 or Ethernet link. The serial link 62 is connected to the serial interface 52 which, in turn, is connected to the local microcontroller 50. To control rotation of the reel, the local microcontroller 50 is coupled to the stepper motor 36 by the motor driver 54. The motor driver 54 is powered by the local power supply 58, which receives power from the slot machine's main power supply. To monitor rotation of the reel, the local microcontroller 50 is coupled to the optical detector 48 by the detector interface 56.

While the CPU 60 of the slot machine performs high-level tasks related to operation of the slot machine and rotation of the reel 12, the local microcontroller 50 performs low-level reel driver operations related to rotation of the reel 12. The respective tasks performed by the CPU 60 and the local microcontroller 50 are described in detail below.

With respect to power-up initialization, the local microcontroller 50 initializes and energizes the stepper motor at power up and resets all necessary reel driver data. The local microcontroller 50 then enters an "idle" state. Although idle, the local microcontroller 50 is able to report a status state to any querying devices, e.g., the CPU 60, and to accept commands from any commanding devices, e.g., the CPU 60.

After power has been applied and the CPU 60 has executed various verification processes to ensure that the slot machine is in working order, the local microcontroller 50 is configured to the game's specific needs. For example, the configuration data may include whether the slot machine is a "slant top" or "upright," the number of symbols on the reel, the number of steps in the motor, and how to drive the motor. The CPU 60 sends the configuration data to the local microcontroller 50 which, in turn, accepts and processes this data and reports the status of the configuration back to the CPU 60.

Next, the CPU 60 commands the local microcontroller 50 to determine the type of reel mechanism installed in the slot machine. As described above, the reel mechanism may include a multi-tab encoder wheel or a single-tab encoder wheel. To make this determination, the local microcontroller 50 causes the motor to spin the reel and, via the detector interface 56, counts the number of tabs that break the optical detector 48. If the encoder wheel includes multiple tabs, as opposed to a single tab, the local microcontroller 50 compares the total number of detected tabs to the number of reel symbols set in the configuration data. Although the number of tabs of a multi-tab encoder wheel does not exactly equal the number of reel symbols, if the number of detected tabs does not equal the required number of tabs for the reel symbols then the local microcontroller 50 reports an error to the CPU 60. In case of an error, the CPU 60 halts initialization of the slot machine. If the reel mechanism is valid for the game's reel symbols, the local microcontroller 50 keeps track of the type of reel mechanism for later use.

With respect to game play, in response to a wager and a player pressing a key or pulling a handle to set the reels in motion, the CPU 60 issues a high-level command to the local microcontroller 50 to start spinning the reel. The start spin command informs the local microcontroller 50 about what direction to spin, a final constant spin speed, and an acceleration profile (how to begin spinning). The local microcontroller 50 then places the motor in a "high current" state for motor acceleration, and then enters a low-level iterative task having a cycle duration of about 1 millisecond.

The low-level iterative task involves such reel driver operations as monitoring the reel and at least partially controlling its position. While spinning, the local microcontroller 50 monitors the optical detector 48 via the detector interface 56 to ensure that the motor is properly rotating the reel. If an error is detected (either no optical breaks or too many optical breaks), the local microcontroller 50 reports the error to the CPU 60 which, in turn, halts the game.

After a predetermined amount of time, the CPU 60 issues a stop command to the local microcontroller 50 for stopping the reel at a specified stop position using a deceleration profile (how to stop spinning the reel). After being commanded to stop spinning the reel, the local microcontroller 50 monitors the optical detector 48 via the detector interface 56, looking for the home position. If the home position is not found, the local microcontroller 50 reports an error to the CPU 60 which, in turn, halts the game. If the home position is found, the local microcontroller 50 decelerates the reel when necessary and eventually stops the reel at the stop position specified in the stop command from the CPU 60.

If the encoder wheel is of the multi-tab type, during the deceleration process the local microcontroller 50 monitors the optical detector 48 via the detector interface 56 to verify that the tab-notch-tab sequence is correct. If the local microcontroller 50 finds an inconsistency while decelerating the reel, the local microcontroller 50 reports an error to the CPU 60 which, in turn, halts the game. If the reel decelerates correctly, then the local microcontroller 50 monitors the optical detector 48 via the detector interface 56 after the reel comes to rest. The game is designed so that the reel should always stop with a notch (gap) of the encoder wheel inside the optical detector 48. That is, an optical path between the optical detector's transmitter and receiver should not be blocked. Due to the alternating tab-and-notch configuration of the multi-tab encoder wheel, if the local microcontroller 50 detects that the optical detector 48 has been broken by a tab after the reel comes to rest, the local microcontroller 50 reports an error to the CPU 60 which, in turn, halts the game.

In response to detecting an error, the local microcontroller 50 reports the error to the CPU 60. The CPU 60, in turn, halts the game and displays the error on the game as a "tilt." The "tilt" condition renders the slot machine unplayable until the error condition is addressed by service personnel.

As stated above, while the reel is spinning, the local microcontroller 50 performs a low-level iterative task independent from the CPU 60. This iterative task is controlled by a reel driver state machine and a reel driver time interval variable. These two pieces of data define what the reel driver should be doing and at what rate. The time interval variable is used to scale the task execution for a particular reel driver state. For example, if the CPU 60 commanded the local microcontroller 50 to spin the reel at a constant speed of 4 milliseconds per step, the reel driver state would be "spin" and the time interval variable would be 4 milliseconds. The local microcontroller 50 would still execute the iterative task every 1 millisecond, but would only execute the "spin" state of the task every 4 milliseconds. The reel driver state machine is changed by the high-level commands (e.g., start spin, stop, etc.) of the CPU 60 and by the local microcontroller's own logic.

Examples of reel driver states include:

Single Tab Idle: If the encoder wheel is of the single-tab type, this operation does nothing.

Multi-Tab Idle: If the encoder wheel is of the multi-tab type, the local microcontroller 50 monitors the optical detector 48 via the detector interface 56 every 10 milliseconds, verifying that the reel has not moved from a notch. This state has a duration of about 20 microseconds.

Acceleration: The local microcontroller 50 begins moving the reel from rest to the spin speed via the acceleration profile included in the high-level start spin command from the CPU 60. This state has a duration of about 50 microseconds.

Spin: The local microcontroller 50 moves the reel at the commanded spin speed. This state has a duration of about 30 microseconds.

Find Home: The local microcontroller 50 moves the reel at the commanded spin speed and begins looking for the home position defined by the encoder wheel. If the optical detector 48 does not detect the home position, the local microcontroller 50 sets an error flag. With respect to a multi-tab encoder wheel, the local microcontroller 50 also sets an error flag if the encoder wheel is stuck on a tab or notch at the optical detector 48. This state has a duration ranging from about 60 to 150 microseconds.

Deceleration Wait: If the home position is found, the local microcontroller 50 moves the reel at the commanded spin speed until deceleration needs to begin. For multi-tab encoder wheels, the local microcontroller 50 flags an error if the encoder wheel is stuck at either a tab or notch at the optical detector 48. This state has a duration ranging from about 70 to 140 microseconds.

Deceleration: The local microcontroller 50 begins decelerating the reel from the commanded spin speed via the deceleration profile included in the high-level stop command from the CPU 60 until the reel comes to rest.

For multi-tab encoder wheels, the local microcontroller 50 flags an error if the encoder wheel is stuck at either a tab or notch at the optical detector 48. This state has a duration ranging from about 50 to 130 microseconds.

Final: After the reel has decelerated and stopped, the local microcontroller 50 prepares to go to either the Single Tab Idle state or the Multi-Tab Idle state, depending upon the design of the encoder wheel. This state has a duration of about 60 microseconds.

In one embodiment, each reel mechanism includes the components illustrated in FIGS. 2 and 3. Each reel mechanism includes a respective reel and an associated reel driver 38, including a local microcontroller 50. Therefore, the three-reel slot machine includes three reel mechanisms with the respective reels 12, 14, and 16 and three respective reel drivers 38. Alternatively, a single reel driver 38, including a single local microcontroller 50, could be used to drive all three of the reels 12, 14, and 16. Each reel, however, would still require its own encoder wheel and optical detector.

The simple, low-cost local microcontroller 50 is advantageous in that it assumes the low-level reel driver operations previously performed by the CPU of prior art slot machines. Because the local microcontroller 50 performs the low-level reel driver operations, the CPU 60 is free to provide better performance for other tasks. The CPU 60 can process data quicker and increase the speed of the overall game. Examples of suitable local microcontrollers 50 for the present invention are Cypress Universal Serial Bus microcontrollers manufactured by Cypress Semiconductor Corp., C541U Family Multipurpose Microcontroller with On-Chip USB Module manufactured by Siemens AG, and certain microcontrollers from ST Microelectronics.

In addition, the local microcontroller 50 allows for the use of the serial link 62 between the reel driver 38 and the CPU 60. The serial link 62 is in the form of a single cable, which is advantageous because it replaces the more costly and complex bundle of wires found between the reel mechanism and CPU of prior art slot machines. The serial link 62 reduces the cost to manufacture the slot machine, improves the reliability of the slot machine, and facilitates future modifications to the reel driver 38.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A slot machine, comprising:

a central processing unit for operating the slot machine in response to a wager; and a reel mechanism including a motor, a symbol-bearing reel, and a reel driver, said motor including a rotatable shaft, said reel being mounted to said shaft, said reel driver including a local microcontroller distinct from and coupled to said central processing unit, said reel driver being coupled to said motor to cause said motor to rotate said reel, said local microcontroller performing low-level reel driver operations independent from said central processing unit;

wherein said central processing unit sends to said local microcontroller at least one of the group selected from an acceleration profile for accelerating said reel and a deceleration profile for decelerating said reel.

2. The slot machine of claim 1, wherein in response to actuation by a player, said reel is rotated and stopped to place the symbols of said reel in visual association with one or more pay lines.

3. The slot machine of claim 1, wherein said low-level reel driver operations include monitoring said reel and at least partially controlling its position.

4. The slot machine of claim 3, wherein said local microcontroller monitors said reel by sampling its state multiple times per second in real time, and responds with control commands for controlling the position of said reel.

5. The slot machine of claim 1, wherein said local microcontroller is serially connected to said central processing unit.

6. The slot machine of claim 1, wherein said central processing unit issues high-level commands to said local microcontroller, said high-level commands including a start spin command for spinning said reel and a stop command for stopping said reel at a specified stop position.

7. The slot machine of claim 1, wherein said reel includes an encoder for indicating the position of said reel, and wherein said reel driver includes an optical detector for reading said encoder, said local microcontroller being coupled to said optical detector to monitor the position of said reel.

8. The slot machine of claim 1, wherein said central processing unit sends to said local microcontroller configuration data including at least one of the type of slot machine, how to drive said motor, or a number of steps in said motor if said motor is a stepper motor.

9. The slot machine of claim 1, wherein in response to receiving said configuration data, said local microcontroller processes said configuration data and reports a status of configuration of said local microcontroller back to said central processing unit.

10. The slot machine of claim 1, wherein said central processing unit is programmed to send a start spin command to said local microcontroller, said acceleration profile being included in said start spin command.

11. The slot machine of claim 10, wherein said start spin command further includes information indicating which direction to spin said reel.

12. The slot machine of claim 10, wherein said start spin command further includes a final constant spin speed of said reel.

13. The slot machine of claim 1, wherein said central processing unit is programmed to send a stop command to said local microcontroller, said deceleration profile being included in said stop command.

14. The slot machine of claim 13, wherein said stop command includes a reel stop position.

15. A slot machine, comprising:

a motor including a rotatable shaft;

a symbol-bearing reel mounted to said shaft;

a reel driver including a local microcontroller serially linked to said central processing unit, said reel driver being coupled to said motor to cause said motor to rotate said reel, said local microcontroller performing low-level reel driver operations related to rotation of said reel; and a central processing unit issuing high-level commands to said reel driver related to the rotation of said reel, said high-level commands including an acceleration profile for accelerating said reel and a deceleration profile for decelerating said reel.

16. The slot machine of claim 15, wherein said high-level commands include a start spin command and a stop command, said start spin command instructing said reel driver to cause said motor to rotate said reel, said stop command instructing said reel driver to stop said motor from rotating said reel at a specified stop position.

17. The slot machine of claim 16, wherein said low-level commands include sampling a state of said reel in real time and at least partially controlling its position.

18. The slot machine of claim 16, wherein said acceleration profile is included in said start spin command and said deceleration profile is included in said stop command.

19. The slot machine of claim 16, wherein said start spin command includes information indicating what direction to spin said reel and a final constant spin speed and said stop command includes said specified stop position.

20. The slot machine of claim 15, wherein said central processing unit sends to said local microcontroller at least one of the type of slot machine, a number of symbols on said reel, how to drive said motor, or a number of steps in said motor if said motor is a stepper motor.

21. The slot machine of claim 15, wherein in response to receiving said configuration data, said local microcontroller processes said configuration data and reports a status of configuration of said local microcontroller back to said central processing unit.

22. A slot machine, comprising:

a motor including a rotatable shaft;

a symbol-bearing reel mounted to said shaft;

a reel driver including a local microcontroller, said reel driver being coupled to said motor to cause said motor to rotate said reel; and a central processing unit for issuing a start spin command and a stop command to said reel driver, said start spin command instructing said reel driver to cause said motor to rotate said reel, said start spin command including an acceleration profile for accelerating said reel, said stop command instructing said reel driver to stop said motor from rotating said reel at a specified stop position, said stop command including a deceleration profile for decelerating said reel;

said local microcontroller monitoring said reel in real time and at least partially controlling its position after said start spin command and prior to said stop command;

wherein said central processing unit sends configuration data to said local microcontroller for configuring said local microcontroller to a reel spinning game conducted with the slot machine.

23. The slot machine of claim 22, wherein said reel includes an encoder for indicating the position of said reel, and wherein said reel driver includes an optical detector for reading said encoder, said local microcontroller being coupled to said optical detector to monitor the position of said reel in real time.

24. The slot machine of claim 22, wherein said configuration data includes at least one of the type of slot machine, a number of symbols on said reel, how to drive said motor, and a number of steps in said motor if said motor is a stepper motor.

25. The slot machine of claim 22, wherein in response to receiving said configuration data, said local microcontroller processes said configuration data and reports a status of configuration of said local microcontroller back to said central processing unit.

26. The slot machine of claim 22, wherein said start spin command includes information indicating what direction to spin said reel and a final constant spin speed and said stop command includes said specified stop position.

27. A method of configuring a slot machine to a reel spinning game conducted with the machine, the method comprising:

providing a physical symbol-bearing reel;

providing a reel controller for performing low-level operations related to movement of said reel;

providing a central processing unit for issuing high-level commands to said reel controller related to the movement of said reel;

sending configuration data from said central processing unit to said reel controller to configure said reel controller to the reel spinning game; and sending from said central processing unit to said reel controller at least one of the group selected from an acceleration profile for accelerating said reel and a deceleration profile for deceleration said reel.

28. The method of claim 27, wherein said configuration data includes at least one of the type of slot machine, a number of symbols on said reel, how to drive said motor, and a number of steps in said motor if said motor is a stepper motor.

29. The method of claim 27, further including processing said configuration data with said reel controller and reporting a status of configuration of said reel controller back to said central processing unit.

30. The method of claim 27, further comprising causing said reel to spin according to said acceleration profile.

31. The method of claim 27, further comprising causing said reel to stop spinning according to said deceleration profile.

32. A method of configuring a slot machine to a reel spinning game conducted with the machine, the method comprising:

providing a physical symbol-bearing reel including an encoder for indicating a position of said reel;

providing a reel controller for performing low-level operations related to movement of said reel;

providing a central processing unit for issuing high-level commands to said reel controller related to the movement of said reel;

sending from said central processing unit to said reel controller an acceleration profile for accelerating said reel;

sending a command from said central processing unit to said reel controller to determine a type of said encoder;

determining the type of said encoder with said reel controller;

sending configuration data from said central processing unit to said reel controller to configure said reel controller to the reel spinning game; and using said reel controller to compare the determined type of said encoder with said configuration data.

33. The method of claim 32, further including reporting an error back to said central processing unit if the determined type of said encoder conflicts with said configuration data.

34. The method of claim 32, further comprising sending from said central processing unit to said reel controller a deceleration profile for decelerating said reel.

35. A method of configuring a slot machine to a reel spinning game conducted with the machine, the method comprising:

providing a physical symbol-bearing reel including an encoder for indicating a position of said reel;

providing a reel controller for performing low-level operations related to movement of said reel;

providing a central processing unit for issuing high-level commands to said reel controller related to the movement of said reel;

sending from said central processing unit to said reel controller an acceleration profile for accelerating said reel;

sending a command from said central processing unit to said reel controller to determine a type of said encoder; and determining the type of said encoder with said reel controller, which includes causing a motor to spin said reel and detecting a physical characteristic of said encoder.

36. The method of claim 35, further comprising sending from said central processing unit to said reel controller a deceleration profile for decelerating said reel.

37. A method of configuring a slot machine to a reel spinning game conducted with the machine, the method comprising:

providing a physical symbol-bearing reel;

providing a reel controller for performing low-level operations related to movement of said reel; and providing a central processing unit for issuing high-level commands to said reel controller related to the movement of said reel, said high-level commands including a command for informing said reel controller of at least one of the group selected from an acceleration profile for accelerating said reel and a deceleration profile for decelerating said reel.

* * * * *